United States Patent

Hoffman

[11] 4,018,083
[45] Apr. 19, 1977

[54] VIBRATION DETECTION PROBE HOLDER

[75] Inventor: Herbert N. Hoffman, Lunenburg, Mass.

[73] Assignee: General Electric Company, Schenectady, N.Y.

[22] Filed: Aug. 22, 1975

[21] Appl. No.: 606,838

[52] U.S. Cl. .................................................. 73/70
[51] Int. Cl.² ...................................... G01H 11/00
[58] Field of Search ............. 73/70, 71.2, 71.4, 67; 324/34 PS, 34 D, 34 E, 37, 40

[56] References Cited

UNITED STATES PATENTS

| | | | |
|---|---|---|---|
| 2,596,048 | 5/1952 | Severs | 73/71.4 |
| 2,764,020 | 9/1956 | Gadd | 73/71.4 |
| 3,089,333 | 5/1963 | Kleesattel | 73/71.4 |
| 3,776,027 | 12/1973 | Campbell | 73/70 |
| 3,835,696 | 9/1974 | Amberger et al. | 73/70 |
| 3,859,847 | 1/1975 | Ronemus | 73/70 |

Primary Examiner—Richard C. Queisser
Assistant Examiner—Stephen A. Kreitman
Attorney, Agent, or Firm—James W. Mitchell; John F. Ahern

[57] ABSTRACT

A vibration detection probe holder for use in measuring the vibration of a shaft employed in rotating machinery such as turbines or generators comprises a stationary probe housing fixed to a bearing bracket or other suitable stationary member. Upon initial assembly, the housing is accurately positioned in close proximity to the shaft. This probe housing is provided with stop means which determine the exact location of a vibration detection probe when such a probe is inserted in the housing, thereby obviating any risk of contacting the rotating shaft with the probe should such an insertion be required while the shaft is rotating. The stop means also ensure that any replacement probe will be located the same distance from the rotating shaft as the probe initially provided in the holder thereby ensuring continuing accurate readings obtained from any such replacement probes. A flexible cable, or a series of sleeves positioned within the housing, provide a means for maintaining the probe in position within the housing. Sealing means disposed at the radially inner end of the housing prevent the splashing of lubricating oil and any contaminants entrained therein from the rotating shaft into the probe holder. The close proximity of the radially inner end of the housing to the shaft reduces the risk of lubricating oil from the shaft splashing into the housing if the probe is removed from the holder.

4 Claims, 4 Drawing Figures

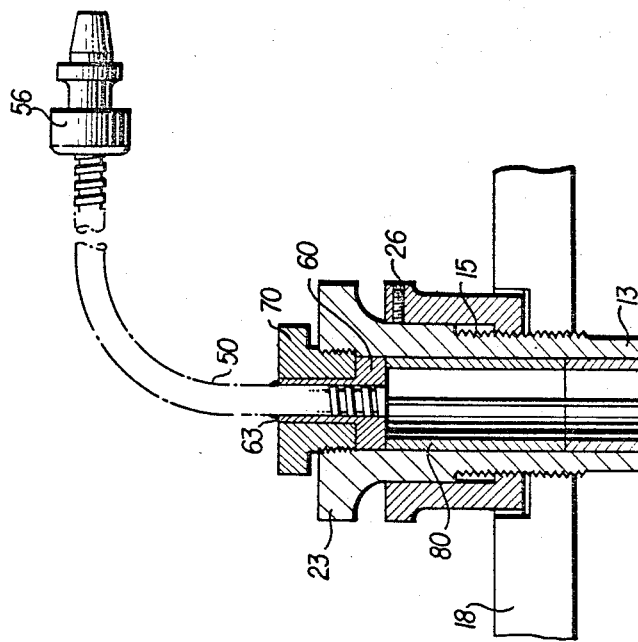
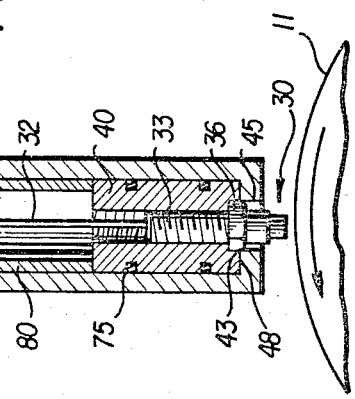
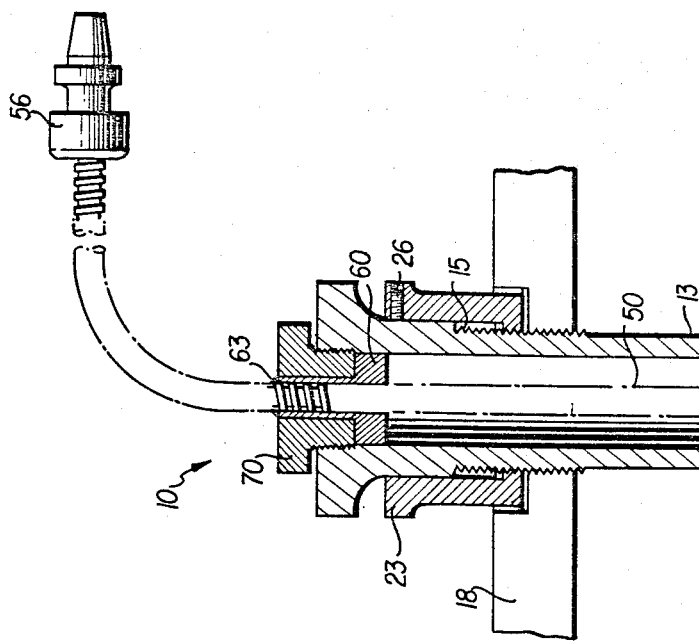
FIG. 1
FIG. 2

VIBRATION DETECTION PROBE HOLDER

BACKGROUND OF THE INVENTION

1. Field of the Invention

This invention relates to a holder for the mounting of a vibration detection probe in radial proximity to a rotating shaft.

2. Description of the Prior Art

It has been the practice to provide in rotating machinery such as turbines or generators, vibration detection probes for measuring the vibration of the rotating shafts employed therein during the normal monitoring of the machinery. In the assembly of the rotating machine and the vibration detection probes associated therewith, it is necessary to accurately radially position the probe in close proximity to the rotating shaft. In prior art vibration detection probe holders, this positioning has been obtained by providing for the adjustment of the position of the probe with respect to stationary components of the holder. Although this method of positioning the probe with respect to the rotating shaft may be effective when the shaft is either stationary or removed from the machine, when the shaft is rotating at a high speed under normal operation, there is a risk of damaging the shaft, the probe, or both should the probe contact the rotating shaft. The probe holder of the present invention eliminates such a risk of contacting the rotating shaft with the probe should the probe be replaced while the shaft is rotating.

Prior art probed holders may allow the exit of lubricating oil and any contaminants entrained therein from the surface of the rotating shaft into the probe holder. A housing employed in conjunction with the probe holder of the present invention may be accurately positioned in close proximity to the rotating shaft, reducing the risk of the escape of such oil and contaminants through the probe holder of the present invention. Moreover, the probe holder of the present invention is provided with sealing means which reduce the risk of the escape of oil and contaminants through the holder.

Therefore, it is an object of the present invention to provide a vibration detection probe holder wherein the probe associated therewith can be accurately positioned in close proximity to a rotating shaft.

It is another object of the present invention to provide a vibration detection probe holder wherein the probe associated therewith may be removed and replaced by another probe of the same design without risk of damaging either the rotating shaft or the probe by the probe contacting the rotating shaft while the rotating machine is operating.

It is another object of the present invention to provide a vibration detection probe holder which prevents the exit of lubricating oil and any contaminants entrained therein from the shaft into the probe holder.

SUMMARY OF THE INVENTION

The objects of the present invention are obtained by providing in a vibration detection probe holder a stationary probe housing fixed to a bearing bracket or other suitable stationary member, and accurately radially positioned in close proximity to a rotatable shaft. This probe housing is provided with stop means which determine the exact location of a probe inserted in the housing, thereby obviating any risk of contacting the rotating shaft with the probe should such an insertion be required while the shaft is rotating. The stop means also ensure that any replacement probe of the same design will be located the same distance from the rotating shaft as the probe initially provided in the holder thereby ensuring continuing accurate readings obtained from any such replacement probes. A flexible cable, or a series or sleeves positioned within the housing, provide a means for maintaining the probe in position within the housing while allowing the removal of the probe in an area of limited access space. Sealing means disposed at the radially inner end of the housing prevent the splashing of lubricating oil and any contaminants entrained therein from the rotating shaft into the probe holder.

BRIEF DESCRIPTION OF THE DRAWINGS

FIG. 1 is a view in partial section of a preferred embodiment of the present invention.

FIG. 2 is a view in partial section of a first alternate embodiment of the present invention.

DESCRIPTION OF THE PREFERRED EMBODIMENT

Figure 3:
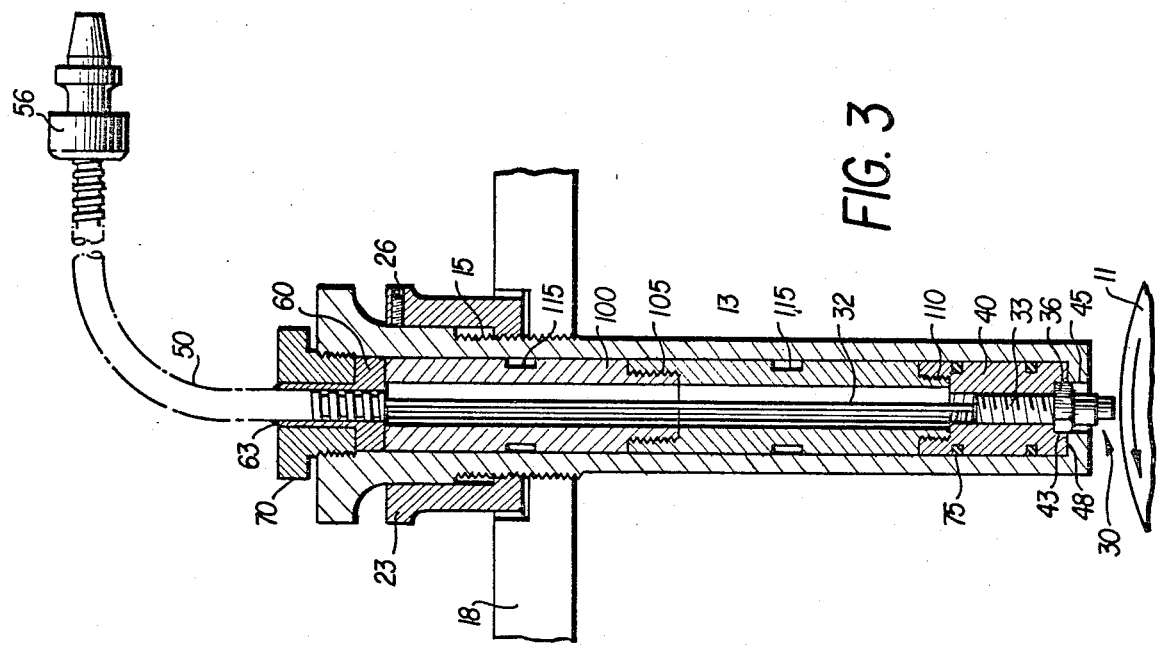
FIG. 3 is a view in partial section of a second alternate embodiment of the present invention.

Referring to FIG. 1, there is shown a vibration detection probe holder 10 located in proximity to a rotating shaft 11 of a turbine, generator, or the like. Holder 10 comprises a tubular housing 13 having a threaded portion 15 located on the outside thereof which is received within a mating threaded aperture in a bearing bracket or other stationary supporting member 18. In order to lock housing 13 to bearing bracket 18, a lock nut 23 is provided and mates with the threads of threaded portion 15 to rigidly secure housing 13. To further ensure that housing 13 remains fixed to bearing bracket 18, lock nut 23 is provided with an aperture located at the head portion thereof, that aperture receiving a set screw 26 which engages housing 13 eliminating the possibility of any relative rotation between housing 13 and lock nut 23.

A vibration detection probe 30 provided with connection leads, one of which is shown at 32, is provided for the monitoring and detection of any vibration of rotating shaft 11. Probe 30 is threaded at 33 and includes a hex head 36 so that it may be screw mounted in a radially inner bushing 40. To further ensure the secure mounting of probe 30 to bushing 40, probe 30 is staked to bushing 40 at, for example, the apex portions 43 of hex head 36. To accurately position vibration detection probe 30 in close proximity to rotating shaft 11 and ensure that probe 30 will not touch shaft 11, stop means 45 which may comprise an inwardly extending annular lip disposed at the inner end of housing 13 is provided. Radially inner bushing 40 engages the upper portion 48 of stop means 45 limiting the radially inward movement of the probe thereby providing for the accurate positioning of the probe when housing 13 is positioned the desired distance from shaft 11. It can be seen then, that once housing 13 is positioned with respect to rotating shaft 11 upon assembly of the apparatus, stop means 45 ensures that the insertion of a probe into the holder will result in no contact between probe 30 and shaft 11 and, therefore, no damage to either of these parts. Moreover, stop means 45 provides for the accurate positioning of a replacement probe thereby ensuring the continuing accurate readings obtained from such a probe.

To provide for the removal of vibration detection probe 30 in an area of only limited access outside probe holder 10, a flexible conduit 50 through which the probe leads extend is provided, and is attached to radially inner bushing 40 at 53 as, for example, by brazing. Probe lead 32 and flexible conduit 50 are provided at their end portions with a cable terminator 56 of a known variety for connecting probe 30 with any instrumentation employed therewith.

Flexible conduit 50 is attached to a radially outer bushing 60, for example, by brazing as indicated at 63. Bushing 60 is held in engagement with housing 13 by nut 70 which is in threaded engagement with housing 13. Flexible conduit 50 is stiff when compressed in an axial direction. Tightening nut 70 will therefore urge radially inner bushing 40 into firm engagement with stop means 45 preventing probe 30 from moving and thus maintaining the accurate positioning of the probe with respect to shaft 11. It can be seen then that the probe may be removed from the holder by loosening nut 70 and pulling a subassembly comprising radially inner bushing 40, probe 30, flexible conduit 50 and radially outer bushing 60 outwardly. The ability of flexible conduit 50 to bend as probe 30 and bushing 40 are withdrawn from housing 13, enables the probe to be removed in a limited access area, i.e., an area having a restriction in the space outside housing 13. Moreover, the ability of conduit 50 to bend ensures that a replacement probe may be reinserted in the apparatus under the same space limitations. Stop means 45 and compressed flexible conduit 50 ensure that should it be desired to replace the probe, the replacement probe, when mounted within the holder, will be positioned exactly the same distance from rotating shaft 11 as was the original probe.

While the surface contact between radially inner bushing 40 and stop means 45 will, in most instances, be adequate for sealing against oil leakage from shaft 11 through the probe holder of the present invention, added sealing may be obtained by the provision of a plurality of O-rings 75 disposed within annular grooves in radially inner bushing 40. To further guard against oil leakage through the probe holder of the present invention, the threaded portion 33 of probe 30 may be coated with a sealant. An oil splash shield 77 may also be provided at the radially inner end of housing 13 to prevent the leakage of oil into the housing. Splash shield 77 comprises a cylindrical member disposed in an annular recess 78 in housing 13. Splash shield 77 reduces the clearance between housing 13 and shaft 11 thereby aiding in the prevention of oil thrown from shaft 11 from entering housing 13.

Referring now to FIG. 2, there is shown a first alternate embodiment of the present invention wherein the portion of the flexible conduit 50 within housing 13 is replaced by a series of hollow sleeves 80 disposed end-to-end within housing 13 providing an alternate means of mounting vibration detection probe 30 while enabling one to remove and replace probe 30 in an area of limited access. Should it be desired to remove this probe, nut 70 loosened and slid outwardly over flexible conduit 50. Lead 32 is drawn outwardly causing radially inner bushing 40 and probe 30 to be drawn outwardly. It can be seen that radially inner bushing 40 will cause sleeves 80 to be drawn outwardly from housing 30 since this bushing engages the innermost sleeve. As each successive sleeve is drawn from the outer portion of housing 13, it is drawn along flexible cable 50 as space dictates toward connector 56 until the final (innermost) sleeve and the probe along with radially inner bushing 40 are removed from housing 13. It can be seen that such a provision of a plurality of short sleeves 80 allows a rigid mounting of the vibration detection probe within housing 13 yet enables one to withdraw probe 30 from the holder with only a minimum amount of free access space to the outer portion of the holder.

Referring now to FIG. 3, showing a third alternate embodiment of the present invention, a series of threaded sleeves 100 are employed rather than the stacked series of sleeves 80 employed in the embodiment shown in FIG. 2 while still enabling one to remove probe 30 in only a minimum amount of free access space. Threaded sleeves 100 engage each other along threaded portions 105 and are threaded into engagement with a radially inner bushing 40 at 110. Probe 30 employed in the embodiment shown in FIG. 3 may be removed in a similar fashion to the probe shown in FIG. 2. To remove probe 30, nut 70 is loosened and slid outwardly along flexible conduit 50. Radially outer bushing 60 and flexible conduit 50 are drawn outwardly causing lead 32, probe 30, radially inner bushing 40, and threaded sleeves 100 to be removed from housing 13. As each threaded sleeve 100 emerges from the outer end of housing 13, it is unscrewed from the next sleeve by an appropriate tool which may engage each sleeve along wrenching flats 115. Any number of these threaded sleeves may be employed. After the final sleeve is removed, the probe may be removed and replaced, stop means 45 ensuring that the replacement probe will be positioned in exactly the same location as the probe which had been removed.

Figure 4:
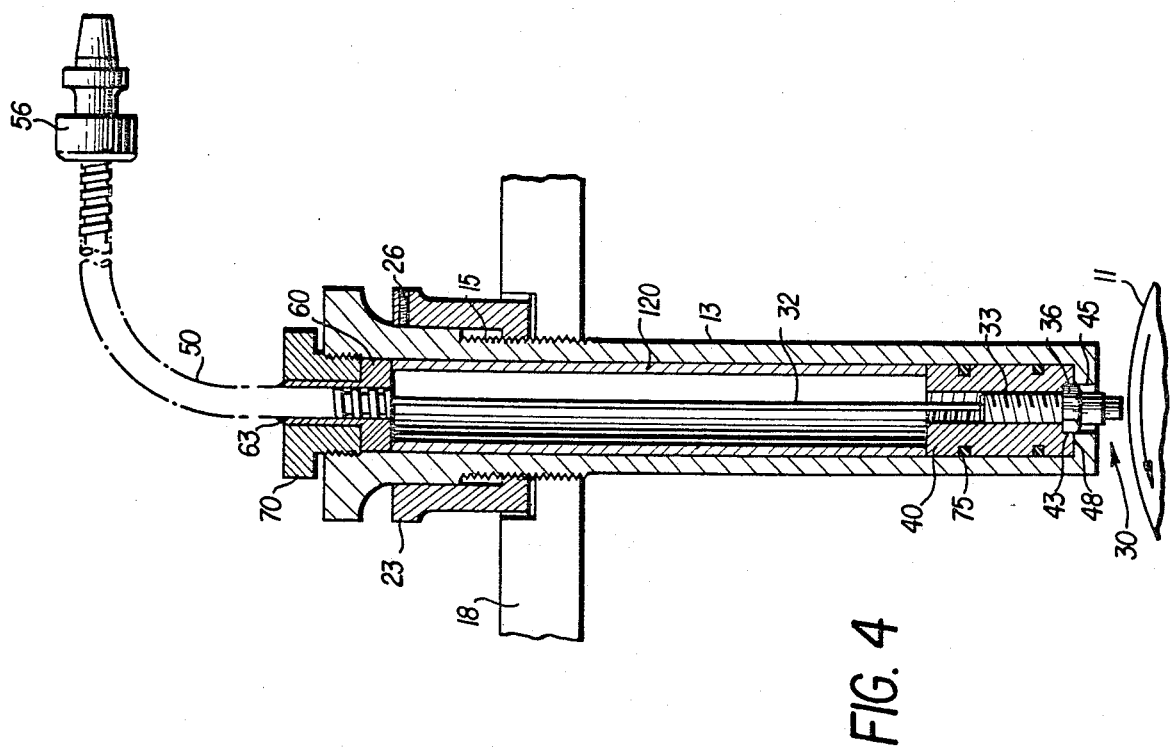
FIG. 4 is a view in partial section of a third alternate embodiment of the present invention.

Referring now to FIG. 4, an alternate embodiment of the present invention is shown wherein the series of sleeves 80 shown in FIG. 2 are replaced by a single long sleeve 120. If there are no restraints on the access to the probe holder, single sleeve 120 provides a simple, yet rigid mount for probe 30 within housing 13 to maintain the accurate positioning of the probe throughout any number of replacements thereof.

It can be seen then that the vibration detection probe holder of the present invention enables the withdrawal and replacement of the probe during the normal operation of the rotating machinery with which it is employed while maintaining the exact position of the replacement probe with respect to the rotating shaft. Stop means 45 ensures that the exact positioning of all replacement probes will be maintained while eliminating any risk that such a replacement probe may contact the rotating shaft damaging itself and the shaft. The probe holder of the present invention enables the probe used therewith to be removed and replaced even in locations of only limited access space by employing either a series of short rigid sleeves or a flexible conduit as a mounting means for the probe. The probe holder of the present invention further ensures that no lubricating oil or contaminants entrained therein will be splashed from the rotating shaft through the assembly by the use of appropriate sealing means and the slight spacing of the probe from the rotating shaft.

Modifications of the apparatus disclosed herein may be made by those skilled in the art without departing from this invention and it is intended by the appended claims to cover such modifications.

I claim:

1. In combination with a large rotating shaft machine, a probe for measuring vibrations occurring in said rotating shaft and said probe being a non-contact vibration detection probe which is maintained out of contact with the rotating shaft, said combination further comprising:
 a probe housing which is supported by said machine having an end portion which is located a first proximate distance from said shaft; said probe housing being disposed substantially radial with respect to said shaft;
 a bore formed within said probe housing receiving said probe;
 stop means formed within said probe housing for limiting the travel of said probe through said probe housing in the radial direction toward said shaft, said probe having an end portion which is located a second more proximate distance from said shaft but out of contact therewith, said probe housing permanently locating said probe with respect to said shaft whereby said probe may be removed and replaced into said housing so as to always be identically repositioned with respect to said shaft; and,
 a splash shield defined by a cylindrical member depending radially inward from the end portion of said probe holder and concentric about the radially inward end of said probe.

2. The combination recited in claim 1 further comprising:
 means for maintaining said probe housing in a locked position with respect to said machine support including a collar for supporting said probe housing on said machine and fastening means through said collar for securing said probe housing in a fixed position.

3. The combination recited in claim 1 wherein the stop means are formed at the radially inward end portion of the probe holder and comprise an annular abutment which engages the probe while allowing the end portion of the probe to extend therethrough toward the shaft.

4. In combination with a large rotating shaft machine, a probe for measuring a condition of said rotating shaft, said probe being maintained out of contact with said rotating shaft, said combination further comprising:
 a probe housing receiving said probe therein, said prove housing supported by said machine and being disposed generally radial to said shaft and having one end portion which is proximate to said rotating shaft;
 locking means disposed between said machine and said housing, said locking means threadably engaging said housing for initial positioning and thereafter securing said probe housing in a fixed position relative to the rotating shaft;
 stop means formed at the one end of said probe housing for limiting the radially inward travel of said probe through said probe housing whereby the probe becomes fixed to a position relative to said rotating shaft dependent upon the initial adjustment of said probe housing relative to said locking means; and,
 a splash shield concentric with said probe and depending radially inwardly from said one end portion of said probe housing.

* * * * *